(12) United States Patent
Stroburg

(10) Patent No.: US 9,781,902 B1
(45) Date of Patent: Oct. 10, 2017

(54) PET-ONLY FEEDER

(71) Applicant: Eldon Leonard Stroburg, Blockton, IA (US)

(72) Inventor: Eldon Leonard Stroburg, Blockton, IA (US)

( * ) Notice: Subject to any disclaimer, the term of this patent is extended or adjusted under 35 U.S.C. 154(b) by 0 days.

(21) Appl. No.: 15/466,365

(22) Filed: Mar. 22, 2017

(51) Int. Cl.
*A01K 5/01* (2006.01)
*A01K 5/02* (2006.01)

(52) U.S. Cl.
CPC .......... *A01K 5/0142* (2013.01); *A01K 5/0114* (2013.01); *A01K 5/025* (2013.01)

(58) Field of Classification Search
CPC ...... A01K 5/0142; A01K 5/0114; A01K 5/01; A01K 5/025
USPC ....................................................... 119/54, 55
See application file for complete search history.

(56) References Cited

U.S. PATENT DOCUMENTS

| 4,022,263 | A | * | 5/1977 | Beckett | ...................... E06B 7/32 |
| | | | | | 119/484 |
| 4,216,743 | A | * | 8/1980 | Cohen | ....................... E06B 7/32 |
| | | | | | 119/484 |
| 4,426,955 | A | * | 1/1984 | Monroe | ................ A01K 11/006 |
| | | | | | 119/51.02 |
| 4,572,108 | A | * | 2/1986 | Daifotes | .............. A01K 1/0005 |
| | | | | | 119/51.01 |
| 7,124,707 | B1 | * | 10/2006 | Clarke | .................. A01K 5/0114 |
| | | | | | 119/51.01 |
| 7,827,935 | B1 | * | 11/2010 | Addleman | ........... A01K 1/0209 |
| | | | | | 119/51.02 |
| 7,874,265 | B1 | * | 1/2011 | Addleman | ............. A01K 5/025 |
| | | | | | 119/59 |
| 2001/0032594 | A1 | * | 10/2001 | Bickley | ................ A01K 5/0114 |
| | | | | | 119/55 |
| 2002/0134313 | A1 | * | 9/2002 | Andrew King | ........ A01K 5/025 |
| | | | | | 119/51.02 |
| 2007/0051317 | A1 | * | 3/2007 | Bruner | ................. A01K 1/0107 |
| | | | | | 119/53 |
| 2016/0157461 | A1 | * | 6/2016 | Hill | ....................... A01K 5/0114 |
| | | | | | 119/51.01 |

\* cited by examiner

*Primary Examiner* — Son T Nguyen
(74) *Attorney, Agent, or Firm* — Daniel M. Northfield

(57) ABSTRACT

A pet-only feeder may include a moveable main platform above a base, with an openable container resting on the base. The openable container may be openable when a handle disconnects from a top of the openable container.

3 Claims, 7 Drawing Sheets

PET-ONLY FEEDER

FIELD OF THE INVENTION

The invention relates generally to the field of feeders for pets.

BACKGROUND

Pet feeders can have various designs. Pet feeders can have a problem with the wrong animal eating from a pet feeder. Accordingly, there is a need for a new and improved pet feeder.

SUMMARY OF INVENTION

According to an exemplary embodiment of the invention, a pet-only feeder comprises a base; a container resting on the base, wherein the container includes a container top, wherein the container top contains a forward edge protruding from the container top; a main platform connected to the base; a binder, wherein the binder connects the container top to the main platform, and wherein the binder is configured to hold an end of the main platform above the base; a platform guide, wherein the platform guide is configured to hold the container in position, and provide support for the binder; a rear connector connected to the container top, and attached to the binder; a handle, wherein the handle is configured to: hold the container top in a closed position in response to the handle resting on the forward edge of the container top; allow the container top to be in an open position in response to the handle being pushed downward toward the main platform, the handle thereby being moved such that the handle is no longer in contact with the forward edge of the container top, wherein the handle is pushed downward toward the main platform in response to a steel bar being placed on a rear platform, wherein the steel bar (attached to a collar such as a pet collar) is magnetically attracted to a magnet on a handle support piece attached to the handle; a handle holder configured to hold the handle and prevent the handle from moving upwards away from the main platform; a handle base piece connected to the handle and attached to a handle structure, wherein the handle structure is attached to the base; and the rear platform attached to the handle structure, wherein the support area is configured to support an animal resting on the support area.

According to another embodiment of the invention, a pet-only feeder comprises: a base; a pair of container support pieces resting on the base; a container resting on and attached to a pair of container support pieces, wherein the container includes: a container top; a container top holder attached to the container top; a container rear support bar; a main platform connected to the base, wherein a spring suspends a first end of the main platform above the base, and wherein the main platform extends between the pair of container support pieces, beneath the container; a binder, wherein the binder connects the container top holder to a rear bar, wherein the rear bar is attached to the main platform, such that the first end of the main platform is suspended above the base; a hook structure, wherein the hook structure is configured to: hold the container top in a closed position in response to a steel bar being unattached to a connecting magnet, wherein the connecting magnet is attached to the hook structure; allow the container top to be in an open position in response to the steel bar (attached to a collar such as a pet collar) being attached to the connecting magnet, wherein the hook structure attaches to a lowering bar attached to the main platform in response to the steel bar being unattached to the connecting magnet, thereby preventing the main platform from moving, and wherein the hook structure disconnects to the lowering bar in response to the steel bar being attached to the connecting magnet, thereby allowing movement of the main platform and allowing the container top to open; a curved rear platform attached to the hook structure, wherein the support area is configured to support an animal resting on the support area.

DETAILED DESCRIPTION

The following description is not intended to limit the scope of the invention, but to generally illustrate the invention. The invention belongs to the field of pet feeders.

Below are descriptions of the number elements in the Figures.

Figure 1:
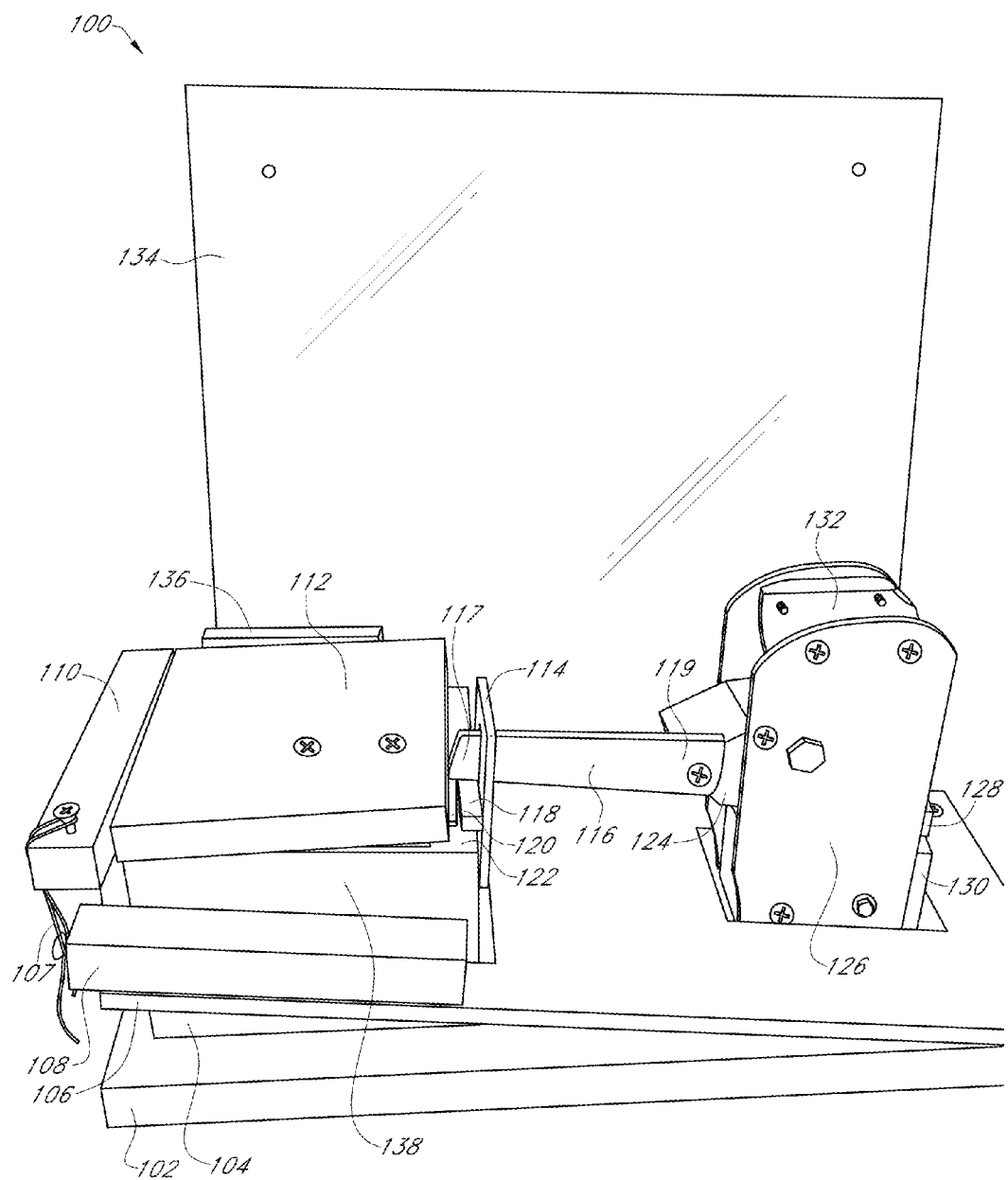
FIG. 1 shows a perspective front view of an embodiment of the invention.

100—pet-only feeder
102—base
104—container wall
106—main platform
107—binder
108—platform guide
110—rear connector
112—container top
114—handle holder
116—handle
117—first end of handle
118—handle prop piece
119—second end of handle
120—forward edge of container top
122—container opening edge
124—handle support piece
125—handle support piece magnet
126—handle structure
128—second base piece
130—first base piece
132—rear platform
134—back piece
135—second back piece
136—back support
138—container
302—container interior
304—collar
315—pet
402—binder
404—rear support panel
406—rear container wall
408—first connector 410—second connector
502—connector
504—first base piece
506—second base piece
508—connector
526—handle structure
624—connector
700—pet-only feeder, another embodiment
702—container
704—pet collar
706—facing plate
708—spring
710—lowering bar (can be extended or lowered to accommodate different sized animals)
712—hook structure
714—connecting magnet
716—steel bar
718—rear support bar (can be extended or lowered to accommodate different sized animals)
720—container top holder
721—container top
722—connecting structure
724—rear bar
726—first lower bar
728—second lower bar
730—container support structure
732—connector
734—container top support structure As shown in FIG. 1, a preferred embodiment exemplifying a best mode of a pet-only feeder 100 can include a base 102, and a container wall 104 of a container 138 configured to hold pet food. The container 138 may include a container top 112 to hold in the pet food and a back support 136 configured to prevent the pet food from spilling from the container 138 when the container 138 is open. The back support 136 may also help close the container top 112 by pulling the container 112 downwardly toward the base 102. The pet-only feeder 100 may include a main platform 106 and a platform guide 108 configured to hold the container in position. The container 138 may include a rear connector 110 that is attached to the platform guide 108 by a binder 107.

In an embodiment, when a pet 315 (FIG. 3) places the pet's weight on the main platform 106, a handle 116 may be held in place by a handle holder 114. The handle may rest on a forward edge 120 of the container top 112, and a handle prop piece 118. The handle holder 114 prevents the first end 117 handle 116 from moving upwards, and thereby helps prevent the container top 112 of the container 138 from opening. The container top 112 may have a forward edge 120 of the container top 112, which rests against the handle 116. The container 138 includes a container opening edge 122 that lays underneath the container top 112. If the handle 116 moves away from the forward edge 120 of the container 138, and a steel bar 716 (see FIG. 7) is placed on the rear platform 132, the container top 112 opens. The handle support piece 124 contains a handle support piece magnet 125 (see FIG. 4) that moves the handle support piece upwards when a steel bar 716 (see FIG. 7) is placed on the rear platform 132. The rear platform 132 may be curved, for example, to conform to a contour of a pet's foot.

In an example, the second end 119 of the handle 116 may move downwardly toward the platform 106 when a steel bar 716 (see FIG. 7) is placed on the rear platform 132. The container top 112 may open when the pet 315 (FIG. 3) further places weight on the platform 106, causing the binder 107 to pull the container top 112 open. Therefore, in order for the container top 112 to open, the pet 315 (FIG. 3) needs to 1) place weight on the platform 106 so the binder 107 pulls on the container top 112, and also 2) the steel bar 716 attached to a collar 704 (see FIG. 7) needs to be placed on the rear platform 132, so that the first end 117 of the handle 116 is pulled away from the forward edge 120 of the container top 112, allowing the container top 112 to open.

A handle structure 126 includes the handle 116, a handle support piece 124, a rear platform 132, a first base piece 130, and a second base piece 128. The handle support piece 124 rests on the second base piece 128. The pet-only feeder 100 may include a back piece 134 and a second back piece (135, See FIG. 5). The back piece 134 and the second pack piece 135 (see FIG. 5) may guide the pet 315 (FIG. 3) onto the pet-only feeder 100. The first back piece 134 and the second back piece 135 are on both sides of the pet 315 (FIG. 3) as the pet 315 (FIG. 3) enters the pet-only feeder 100. The pet 315 (FIG. 3) may support itself by, for example, resting a leg on the rear platform 132.

Figure 2:
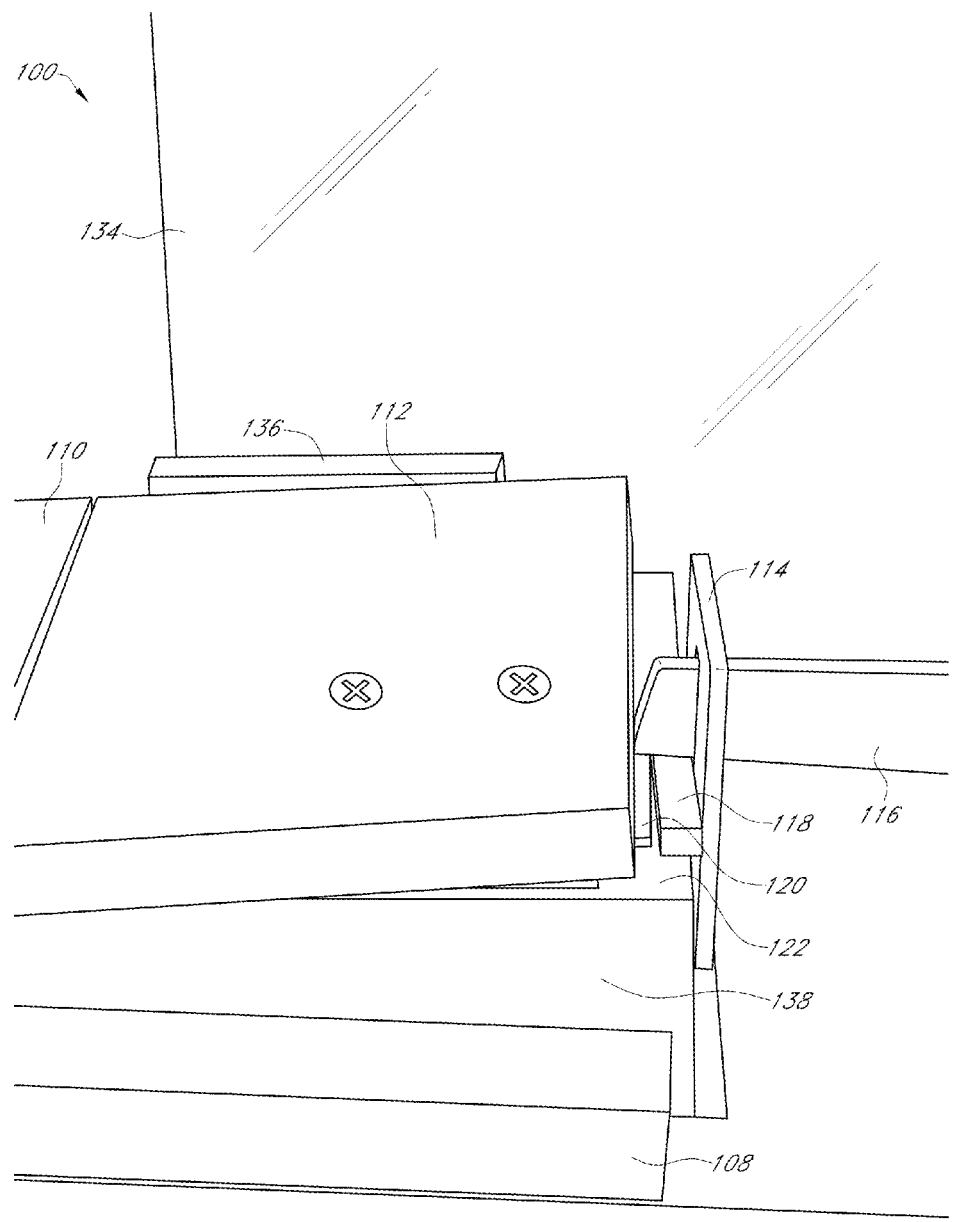
FIG. 2 shows a close up view of a latch mechanism of the embodiment of the invention from FIG. 1.

FIG. 2 shows a close-up view of the container 138 help in a closed position by the handle 116. The handle 116 is resting on the handle prop piece 118 and the forward edge 120 of the container top 112. The handle holder 114 helps prevent an upward movement of the handle 116.

Figure 3:
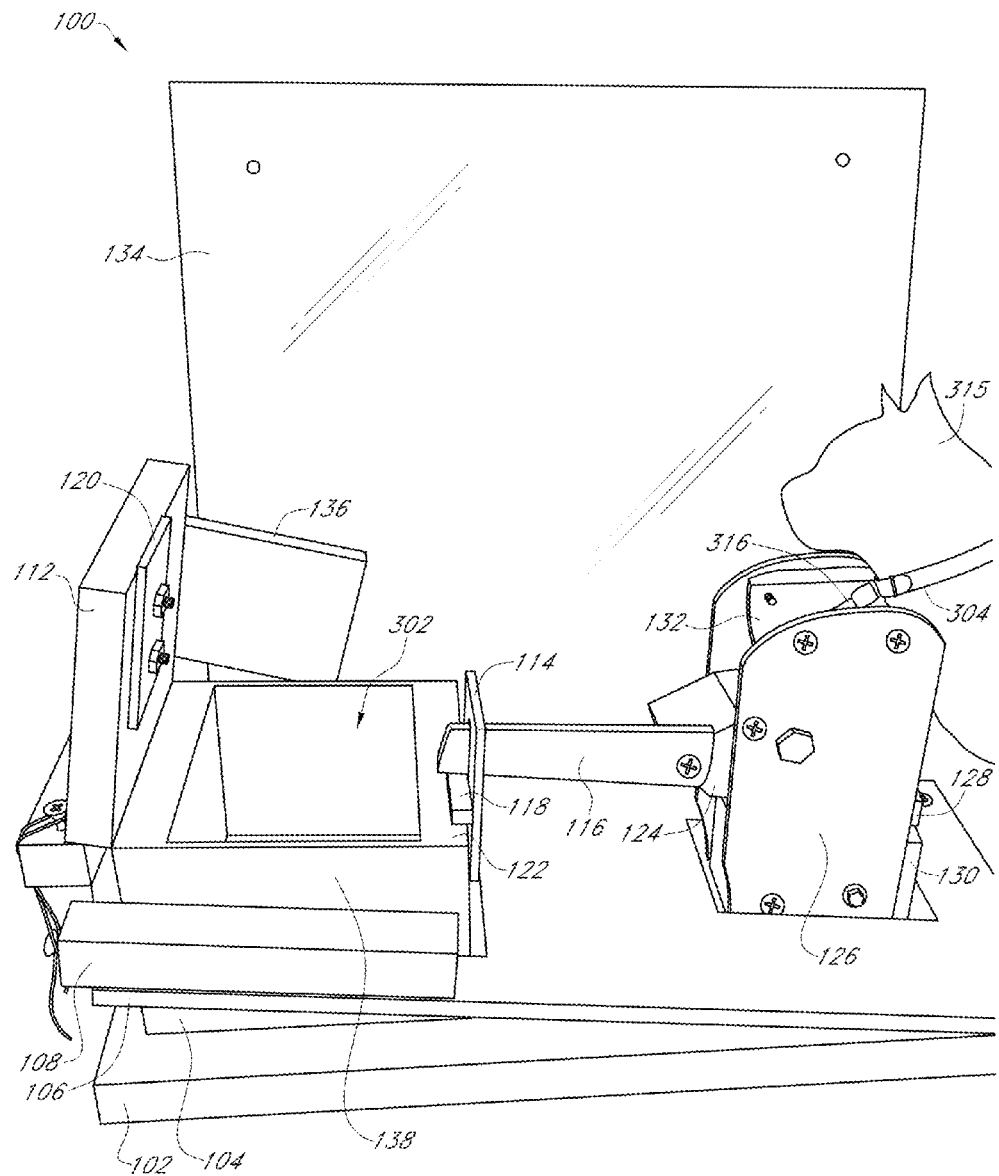
FIG. 3 shows another perspective view of an embodiment of the invention of FIG. 1 with a feeder container open.

FIG. 3 shows an embodiment of the invention of FIG. 1 with the container 138 open. A pet collar 304 is shown with a steel bar 316 attached. Shown also is an interior 302 of the container 138.

Figure 4:
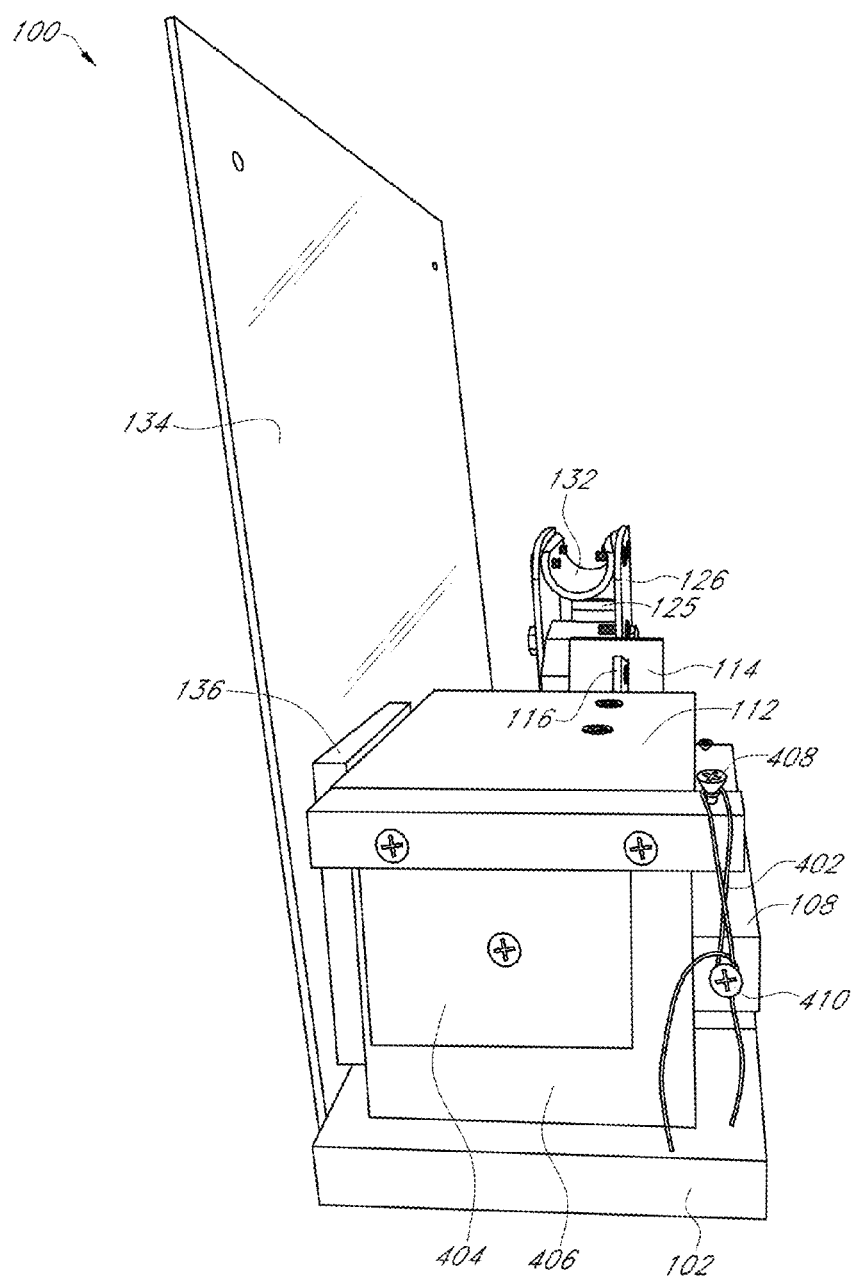
FIG. 4 shows a side perspective view of the embodiment of the invention in FIG. 1.

FIG. 4 shows a side perspective view of the embodiment of the invention in FIG. 1. Also shown is a rear support panel 404 for the container 138, a rear wall 406 of the container 138, a first connector 408, a second connector 410, and a binder 402. The rear support bar 718 can be extended to accommodate larger animals. The binder 402 may bind the container top 112 to the container 138. The binder 402 may be attached to the container 138 by the first connector 408 and the second connector 410. The binder 402 may be, for example, string, or other flexible material. The first connector 408, and the second connector 410 may be, for example, screws, nails, or other connecting apparatus.

Figure 5:
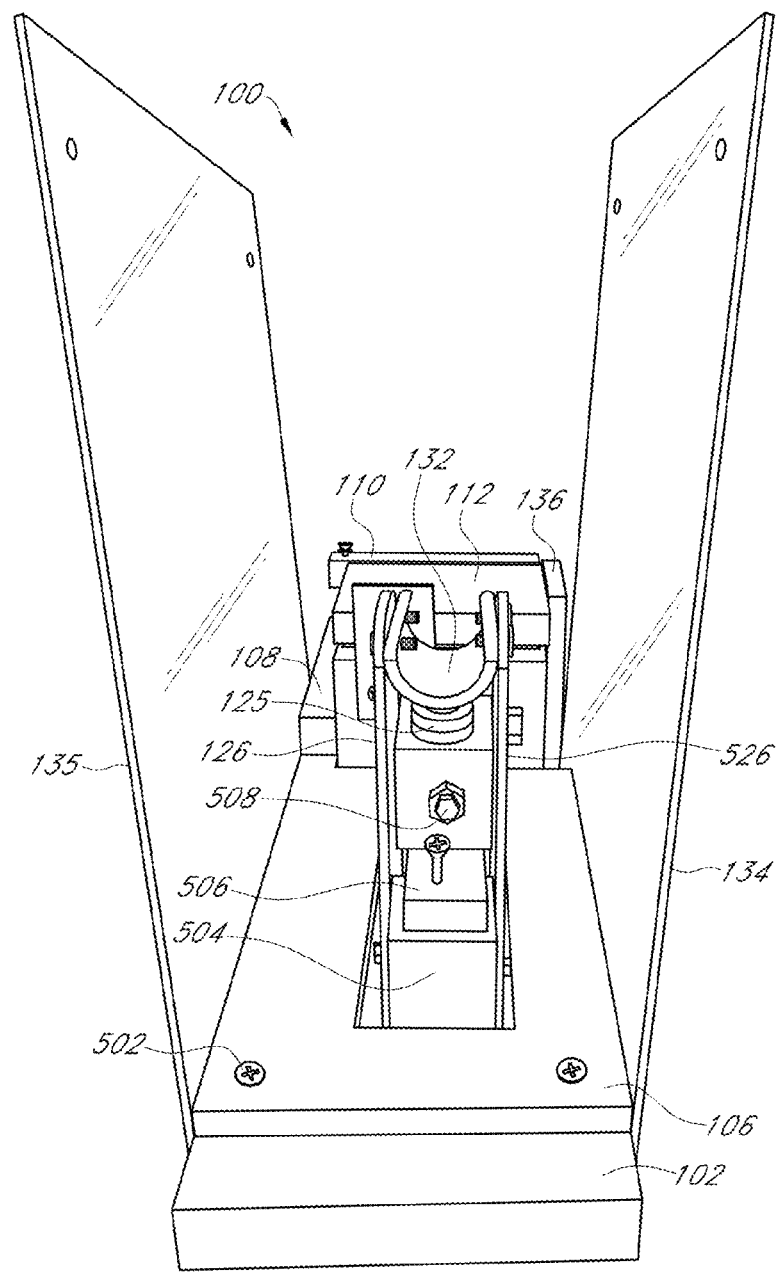
FIG. 5 shows another side perspective view the embodiment of the invention of FIG. 1, shown from an opposite side from FIG. 4.

FIG. 5 shows another side perspective view the embodiment of the invention of FIG. 1, shown from an opposite side from FIG. 4. Also shown are the first base piece 130, the second base piece 128, magnet 125, and connectors 502, 508 which hold together the handle structure 126. Shown also is a second back piece 135.

Figure 6:
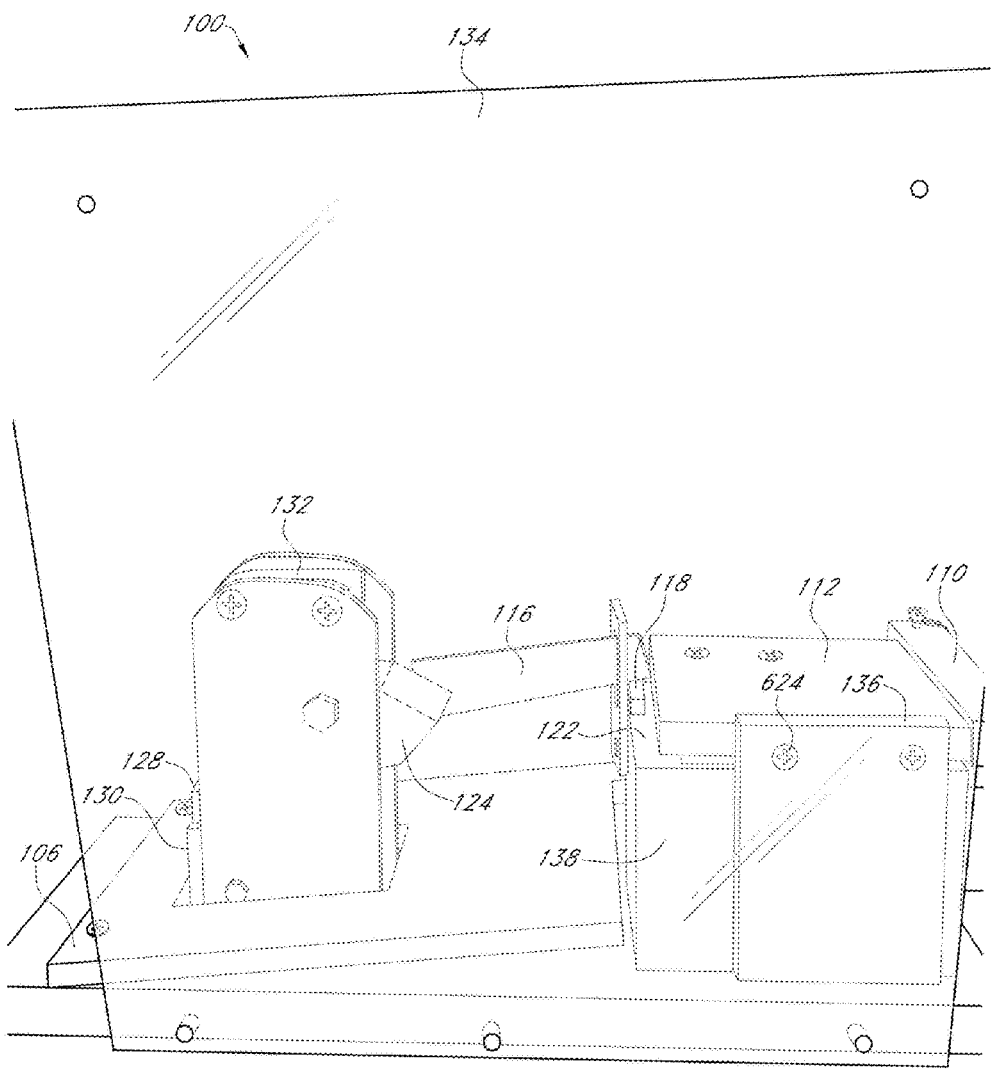
FIG. 6 shows a perspective rear view of the embodiment of the invention of FIG. 1.

FIG. 6 shows a perspective rear view of the embodiment of the invention of FIG. 1. Also shown is a connector 624 holding the back support 136 to the container 138.

Figure 7:
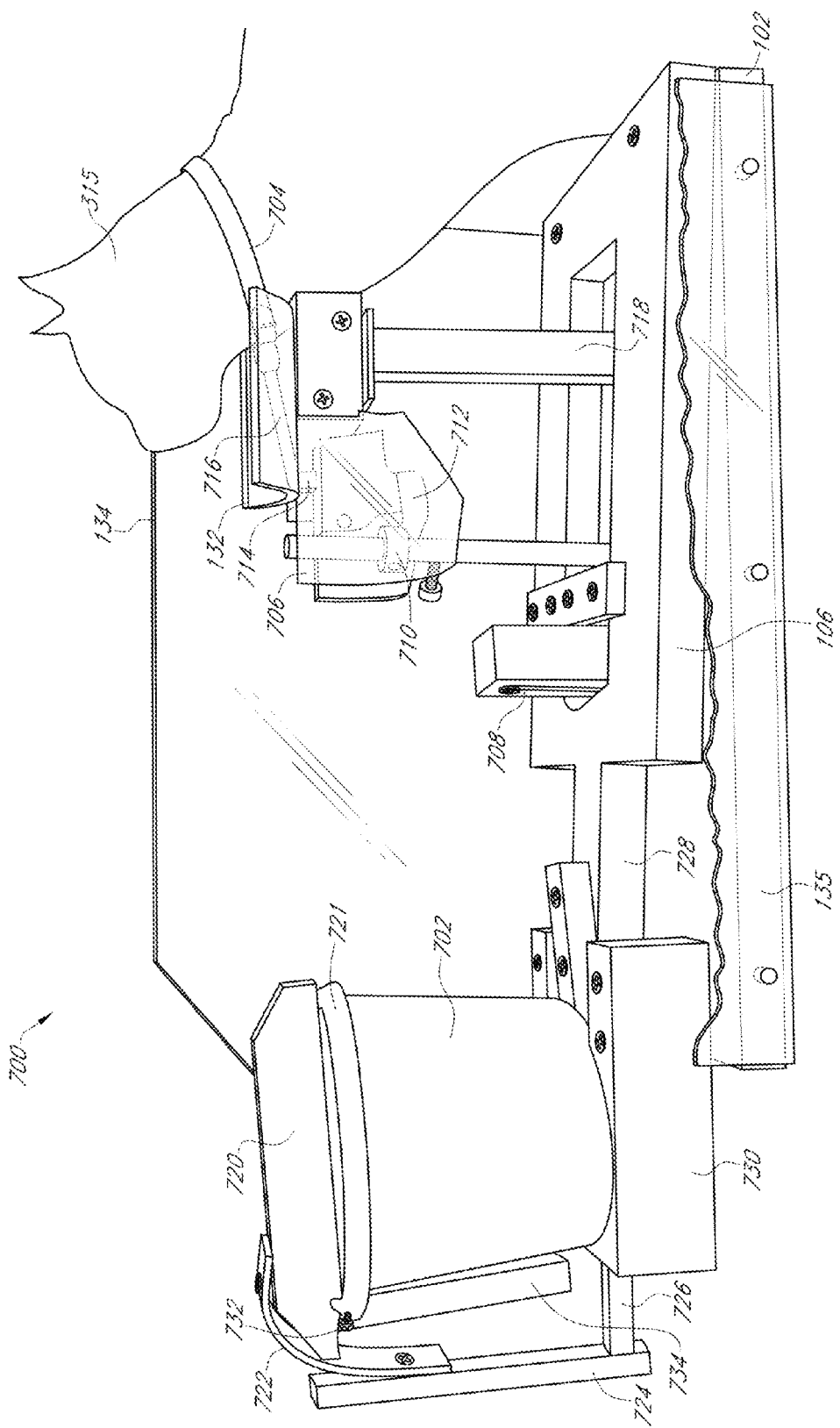
FIG. 7 shows a perspective view of another embodiment of the invention of FIG. 1, with a magnet assembly.

FIG. 7 shows a perspective view of another embodiment 700 of the invention of FIG. 1, with a magnet assembly. Shown is a container 702, a container top holder 720, a container top 721, a connecting structure 722, a rear bar 724, a container top support structure 734, a first lower bar 726, a second lower bar 728, a spring 708, a steel bar 716 attached to a collar 704 for example, on a pet 315, a connecting magnet 714, a hook structure 712, a lowering bar 710, a facing plate 706, a rear support bar 718, a pet collar 704, a container support structure 730, a back piece 134, a second back piece 135, a main platform 106, and a base 102. Both the lower bar 710 and the rear support bar 718 can be extended or lowered to accommodate pets of different sizes. The second lower bar may be connected to the platform 106, and the second lower bar 726 may be connected to the first lower bar 728. The second lower bar may also be connected to the rear bar 724. Therefore, movement of the platform 106 may cause movement in the second lower bar 728, the first lower bar 726, the rear bar 724, the connecting structure 722, the container top holder 720, and the container top 721. The connector 732 shown may, for example, secure a hinge element or other flexible structure to allow opening and closing of the container top 720. The container 702 may rest on the container support piece 730.

In an example embodiment, the pet 315 may bring the pet collar 704 onto the platform 132 such that the steel bar 716 comes in contact with the connecting magnet 714. For example, the pet collar 704 may be attached to the steel bar 716, such that the steel bar 716 may move as the pet collar 704 moves, when a pet 315 wearing the pet collar 704 moves. When the steel bar 716 comes in contact with the connecting magnet 714, the hook structure 712 may be pulled back toward the rear support bar 718, thereby releasing the hook structure 712 from attaching to the lowering bar 710. When the lowering bar 710 is released from the hook structure 712, the lowering bar may proceed downwardly toward the base 102. The lowering bar is attached to the platform 106, so that when the pet 315 places weight on the platform 106, the platform 106 may pull on the rear bar 724 and connecting structure 722, and container top holder 720, thereby opening the container top 721. Therefore, in order to open the container top 721, 1) the pet 315 needs to place weight on the platform 106 so that the platform 106 pulls on the rear bar 724, connecting structure 722, and container top holder 720. 2) The pet 315 also needs to bring the steel bar 716 into contact with the connecting magnet 714 so that the hook structure is pulled back toward the rear bar 724, and allows the lowering bar to move downward toward the base 102, thereby allowing the platform to move downwardly toward the base 102, thereby pulling the container top 721 open. The spring 708 may help cushion the downward movement of the platform 106 when the pet 315 places weight on the platform 106.

If the pet 315 moves weight off the platform 106, the container top 721 may close. If the pet 315 moves the pet collar 704 off of the platform 132 such that the steel bar 716 is no longer in contact with the connecting magnet, then the hook structure may reconnect with the lowering bar 710 so that the container top 721 may be secured in the closed position when the pet 315 releases pressure from the platform 106.

The facing plate 706 may protect the hook structure from damage.

The invention can be made of any suitable material including but not limited to, cloth products, plastic products, rubber products, and other natural or human made materials.

The above description can be modified without departing from the scope of the claims below.

What is claimed is:
1. A pet-only feeder, comprising:
a base;
a container resting on the base,
   wherein the container includes a container top,
   wherein the container top contains a forward edge protruding from the container top;
a main platform connected to the base;
a binder,
   wherein the binder connects the container top to the main platform, and wherein the binder is configured to hold an end of the main platform above the base;
a platform guide,
   wherein the platform guide is configured to hold the container in position, and provide support for the binder;
a rear connector connected to the container top, and attached to the binder;
a handle,
   wherein the handle is configured to:
     hold the container top in a closed position in response to the handle resting on the forward edge of the container top;
     allow the container top to be in an open position in response to the handle being pushed downward toward the main platform, the handle thereby being moved such that the handle is no longer in contact with the forward edge of the container top,
   wherein the handle is pushed downward toward the main platform in response to a steel bar attached to a pet collar being placed on a rear platform, wherein the steel bar attached to the pet collar is magnetically attracted to a magnet on a handle support piece attached to the handle;
a handle holder configured to hold the handle and prevent the handle from moving upwards away from the main platform;
a handle base piece connected to the handle and attached to a handle structure, wherein the handle structure is attached to the base; and
the rear platform attached to the handle structure, wherein the support area is configured to support an animal resting on the support area.

2. The pet only feeder of claim 1, including a back piece affixed to a side of the base, wherein the back piece extends upwardly above the container top.

3. The pet-only feeder of claim 1, including a container back support, wherein the container back support is attached to the container top and is configured to guide the container top as the container top opens.

\* \* \* \* \*